Figure 1:
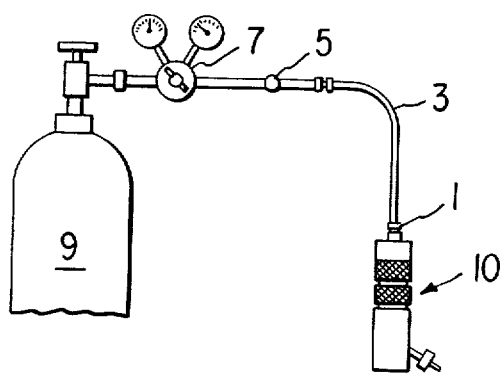

United States Patent [19]
Schaeffer

[11] 3,887,144
[45] June 3, 1975

[54] CYTOLOGICAL CELL DISRUPTION APPARATUS

[76] Inventor: Warren I. Schaeffer, Manor Woods Apartments, No. 28, Kennedy Dr., South Burlington, Vt. 05401

[22] Filed: June 25, 1974

[21] Appl. No.: 482,846

[52] U.S. Cl. ............................. 241/301; 241/1
[51] Int. Cl. ............................. B02s 19/00
[58] Field of Search ..................... 241/1, 301

[56] References Cited
UNITED STATES PATENTS

| | | | |
|---|---|---|---|
| 2,318,693 | 5/1943 | Joyce et al. | 241/1 |
| 2,928,614 | 3/1960 | Emanuel et al. | 241/1 X |
| 3,165,266 | 1/1965 | Blum et al. | 241/1 |
| 3,309,032 | 3/1967 | Filz et al. | 241/301 |
| 3,458,139 | 7/1969 | Edebo | 241/301 X |
| 3,556,414 | 1/1971 | Eberty et al. | 241/301 X |

*Primary Examiner*—Granville Y. Custer, Jr.
*Attorney, Agent, or Firm*—Gardiner, Sixbey, Bradford and Carlson

[57] ABSTRACT

A cytological cell disruptive apparatus is comprised of a generally tubular pressure chamber having an open end adapted to receive in screw-threaded engagement a closure and a removable filter unit fitted internally of the chamber and beneath the closure; the opposite end of the chamber is provided with a precision manually operable valve to permit a precision control of decompression within the chamber which is charged from an external source of gas, preferably nitrogen through a suitable fitting in the closure; a cell sample is placed within the chamber and subjected to pressure as high as 2,200 psi gage after which decompression causes the cells to rupture to provide for microscopic and/or biochemical examination of the ruptured tissue.

10 Claims, 8 Drawing Figures

CYTOLOGICAL CELL DISRUPTION APPARATUS

BACKGROUND

The examination of cell tissue commonly referred to as cell biology or pathology, is an acknowledged valuable tool in medical research and diagnosis, particularly in the study and diagnosis of diseases which have a disruptive effect on cell growth, multiplication, reproduction, biochemistry and the like of which cancer in humans is the most insidious example. In some studies, a tissue sample is removed from the living organism, be it plant or animal and by known techniqus the tissue is prepared for microscopic examination. Generally, the tissue is carefully stained or colored to highlight the cell structure which is then mounted on glass slides for visual inspection under high powered optical systems. All culture techniques have been developed wherein samples of tumor and/or normal tissue are grown outside of the animal in order to more easily study cellular processes. Oftentimes, it is necessary to actually open up the cell and various techniques have been employed to effect this result. For example, the cell tissue may be subjected to manual pressure via mortar and pestle. Another technique involves the use of ultrasonic energy to break down the tissue. Mechanical agitation has also been employed. Each of these techniques, however, requires considerable personal skill and each also subjects the cell to extraneous effects which may have a deleterious action on delicate enzymes and organelles. One such adverse influence is heat which can adversely affect the cell tissue. In general then, it can be stated that known techniques of cellular disruption have left much to be desired until about 1961.

In 1961 two authors, Hunter and Commerford published a paper entitled "Pressure Homogenization of Mammalian Tissues," in which they described a new technique for cellular disruption in which the cellular tissue is subjected to a high pressure gas and after a stabilization period, the pressure is released at a controlled but fairly rapid rate resulting in disruption of the cell tissue as the gas, which has been absorbed by the tissue, comes out as expanding bubbles which stretch the membranes of each cell until they rupture. By control of pressures, solutions and rate of decompression, various degrees of disruption can be obtained with remarkable degrees of accuracy and predictability. The authors further disclosed use of nitrogen as the gaseous medium because it is inert and because it will cool the tissue during the decompression phase to eliminate the undesired effects of heat on the cell tissue.

As might be expected, the technique described by Hunter and Commerford was widely acclaimed in medical circles and has become a widely used and established research and diagnostic technique. As also was to be expected, manufacturers of medical instruments and research equipment began to develop the necessary equipment to effect the technique under sanitary and safe conditions, particularly since very high gas pressures ranging from 6 to 700 psi gage up to 2,000 psi gage are required in carrying out the process. Of the many manufacturers involved in producing "Cell Disruption Bombs" as the equipment became identified, a noteworthy contributor has been Parr Instrument Company of Moline, Ill. This organization produces and sells a variety of pressure containers which are used extensively throughout the world in pathological investigations. It is with this type of apparatus that the present invention deals and has for its primary purpose the provision of a cytological cell disruption apparatus having numerous advantages over existing apparatus.

THE INVENTION

More specific purposes of the present invention will be apparent to those skilled in the art so that briefly it can be stated that at least some of the objectives are to provide:

1. A unit which can be readily hand assembled without the use tools; '2. A unit which incorporates an in-line filter and filter mounting to keep the media readily under aseptic conditions;

3. The use of unique extenders allows doubling or tripling or quadrupling of its capacity without the necessity of purchasing multiple various sized units;

4. A unique valve structure for controlling decompression easily and at varied rates;

5. A unit which is readily dismantled and sterilized for repeated use; and

6. A unit which is safe and practical to use.

The objectives noted are obtained by a cell disruption apparatus comprised of a hollow pressure chamber fabricated of a material, preferably stainless steel, able to withstand high pressure, said chamber having one conical interior end wall, the apex of which defines an outlet port that may be regulated by a manually operated valve having a generally conical plug which seats in said port, said plug in turn having discharge passages which extend from a point just rearwardly of the tip of the plug through the valve stem integrated with said plug to a discharge port; the opposite end of said chamber being open; said chamber having exterior threads to receive in threaded engagement the cylindrical skirt of a closure cap, said cap having a hollow interior receiving the end of a changeable filter assembly, said cap also having an inlet aperture and seal means positioned between said cap and said filter assembly and said filter assembly and said chamber. Enlargement of the volume of said pressure chamber is readily effected by threading additional tubular sections on the threaded end thereof and closing said sections by means of said cap.

Figure 2:
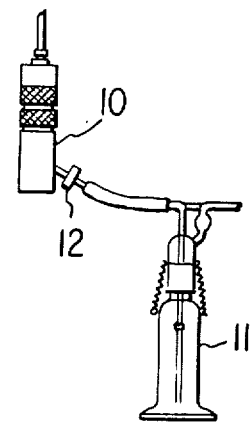
Figure 3A:
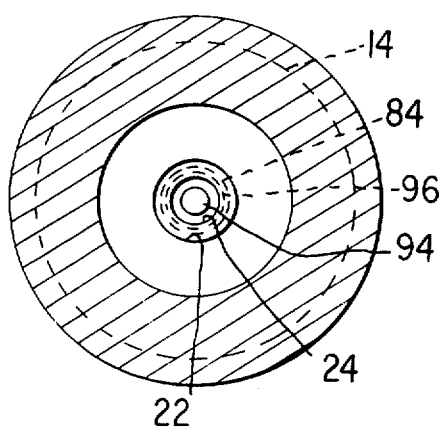
Figure 6:
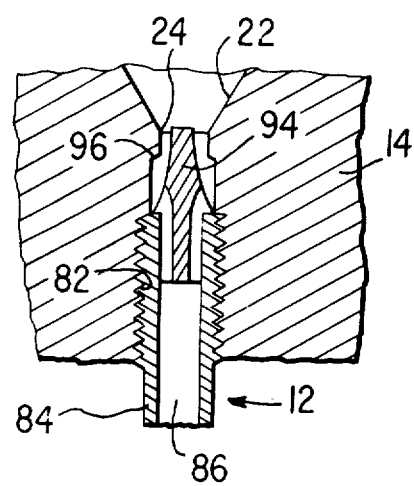
Figure 7:
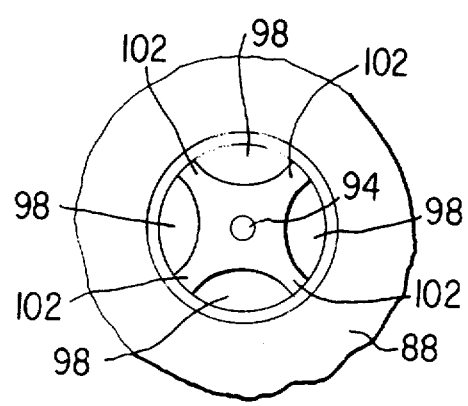
Figure 3:
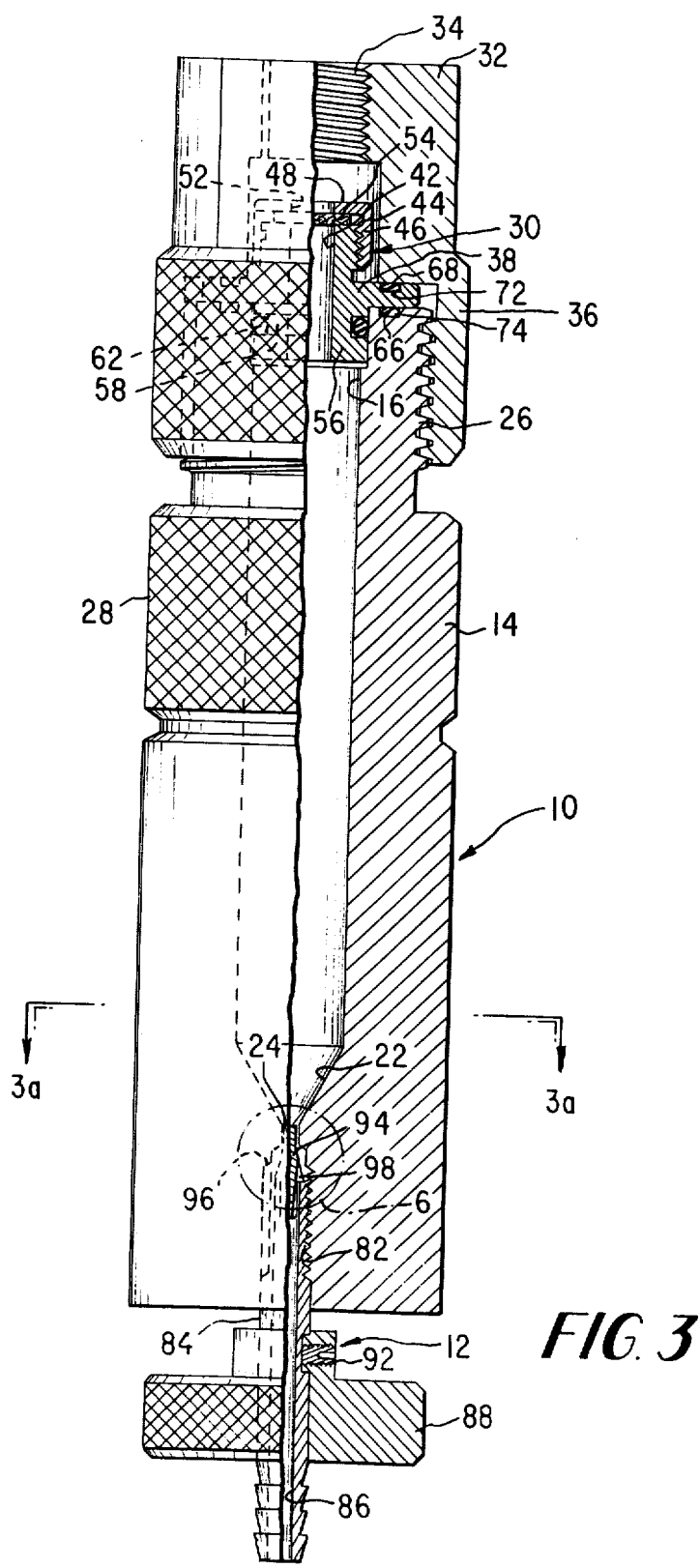
Figure 4:
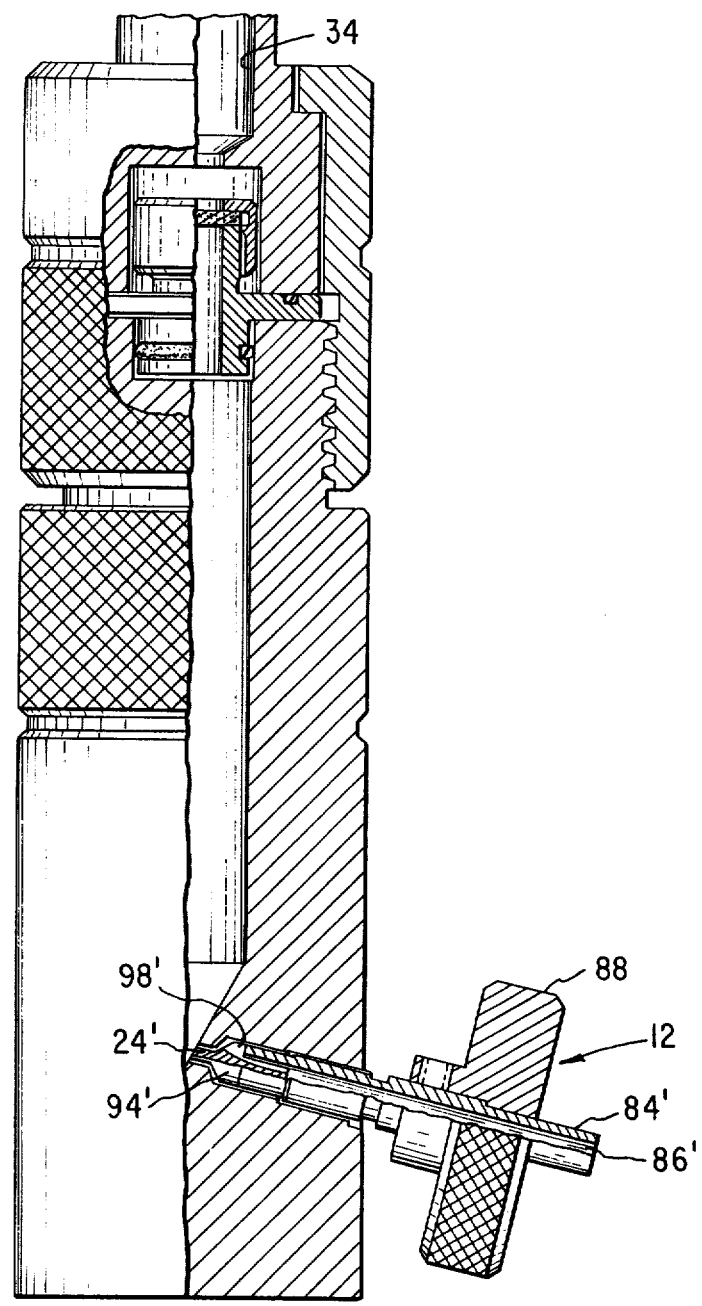
Figure 5:
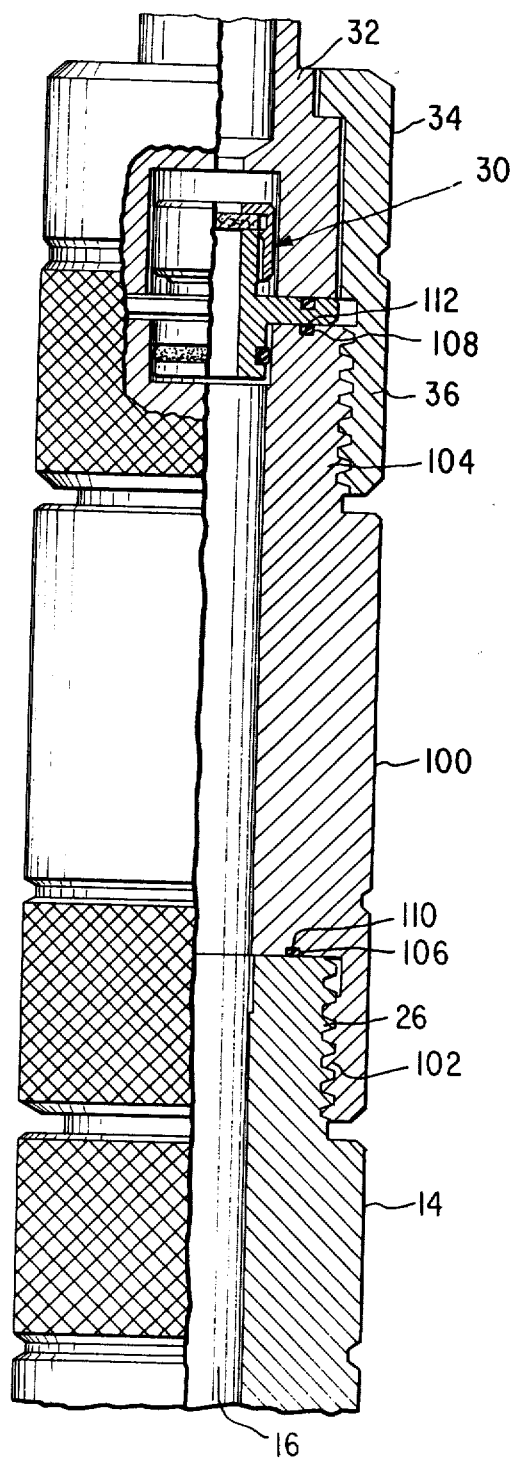

Having broadly defined the invention, reference is now made to the drawings appended hereto and forming an integral part of the following detailed description and wherein:

FIG. 1 is an overall schematic view showing the invention incorporated in a charging system, FIG. 2 is an overall schematic view of the invention incorporated in a specimen recovery system, FIG. 3 is an enlarged side sectional view of the cytological cell disruption apparatus shown in FIGS. 1 and 2, FIG. 3a is a sectional view through the apparatus defined in FIG. 3, FIG. 4 is a side elevational view of a modified apparatus, FIG. 5 is a side elevational view of another modification utilizing an extender to enlarge the capacity of the apparatus, FIG. 6 is an enlarged view of the valve assembly within the area 6 of FIG. 3, while FIG. 7 is an enlarged end view of the valve operator shown in FIG. 6.

Directing attention to FIG. 1, it may be seen that the cell disruption apparatus 10 is provided with an inlet fitting 1 adapted to be connected to a high pressure inlet line 3. The inlet line 3, in turn, is in communication with a source of gas under high pressure via a throttle valve 5 and a pressure regulator 7. In the disclosed system, the pressure source is a conventional tank of nitrogen gas 9.

The tissue specimen having been placed in apparatus 10, as will be described, the apparatus is then charged with high pressure nitrogen on the order of 600 psi gage to 2,000 psi gage, depending on the desired degree of disruption of the cells of the tissue specimen. The apparatus is then held at the charged pressure for a sufficient time to assure that the gas is absorbed into the tissue. During this period the apparatus 10 may be cooled if need be to prevent undesired deterioration of the specimen.

As the selected time the apparatus 10 is connected to a suitable receptable 11, as shown in FIG. 2, through a valve 12 and the apparatus is then de-pressurized or decompressed at a fairly rapid rate so as to cause the cells in the tissue specimen to erupt and thus expose the nuclei organelles and enzymes comprising the cell structure as the contents of the apparatus are discharged into the receptacle 11.

It should be noted here that the tissue specimens are in a liquid suspension of isotonic solutions the composition of which is determined by known analysis depending on the intended use of the specimen, after cellular disruption. The size of the specimen is limited only to the extent that it will pass through the outlet valve 12 during de-compression. It should also be noted that the valve 12 must provide for very fine control of the rate of de-compression to assure that the specimen attains the proper degree of disruption.

The apparatus 10, in the final analysis, comprises a pressure chamber the details of which are illustrated in FIGS. 3, 4, 5 and 6 in several modifications. Considering first FIG. 3, it may be seen that the chamber 10 is a hollow cylinder 14 fabricated of a material capable of withstanding very high pressure. A preferred material is stainless steel because it is durable, easily cleaned and can be autoclaved without harm to assure complete sterilization for each use. The cylinder is completely open at one end 16 while the opposite end 18 is closed by a conical end wall 22 which tapers to a small outlet port 24.

The exterior of the cylinder is provided with a threaded neck 26 of somewhat reduced diameter adjacent the open end 16. Also circumscribing the exterior surface is a knurled band area 28.

The chamber 10 is closed by a cap 28 which is comprised of a closure disc area 32 having an inlet port 34 and a cylindrical interiorly threaded skirt 36 to define within the cap a space which receives the outer end of a removable filter assembly 30.

The filter assembly 30 is comprised of a disc-shaped filter support 38 having a central aperture 42. Integral with the discshaped support 38 is a cylindrical nipple 44 having exterior threads 46. Threads 46 are engaged by the interiorly threaded skirt of a cap 48 also having a central opening 52 in alignment with the aperture 42 of the disc-shaped filter support 38 and nipple 44. Disposed between the end of nipple 44 and the interior of cap 48 is a filter pad 54 of an inert material such as diatomaceous earth, polyurethane, or the like, which, preferably, has a pore size ideally between 0.22 and 0.45 microns, but certainly no more than 1.0 micron.

The bottom surface of the disc-shaped filter support is also provided with a cylindrical nipple 56 having a diameter such as to fit snugly within the hollow interior of chamber 14 and being provided with a circumferential groove 58 which receives a conventional O-ring seal 62.

It will also be noted that the end face 64 of the wall of chamber 14 is also provided with an annular groove 66 as is the face of the disc-shaped filter support at 68 and that both grooves 66 and 68 receive conventional O-ring seals 72, 74.

As should be readily apparent, the apparatus is readied for use by first removing cap 32 and filter assembly 30. The interior of the chamber receives a tissue specimen after which the filter assembly 30 is replaced and cap 32 replaced and tightened down to close the apparatus. No special tools are needed, as the cap may be hand tightened so as to effect a complete sealing by seals 62, 72 and 74. To this end, the exterior of the skirt 36 of cap 32 is knurled along with the knurled area 28 on the chamber, to assist the user in holding the apparatus and tighten the cap in place.

A suitable coupling 1 is threaded into the aperture 34 in cap 32 and the system is now in the FIG. 1 configuration.

Turning now to the bottom of the chamber 14, and in particular FIG. 3 and FIG. 6, the valve means 12 for controlling de-compression is illustrated in detail. The port 24 which communicates with the interior of the chamber through conical end wall 22, also communicates with a threaded bore 82 which opens outwardly through the bottom of the chamber. The threaded bore 82 receives a threaded valve stem 84 which itself is hollow being provided with an axial passage 86 and terminates in a connector end 88 adapted to fit within suitable flexible tubing such as surgical hose as shown in FIG. 2.

Surrounding the valve stem 84 is a knurled operator knob 88 which is fastened thereon by means of a set screw 92 so that as the knob is rotated the stem is moved in and out axially as is conventional with a rotary valve.

The inner end of valve stem 84 is provided with a generally cone-shaped plug 94 which has its apex end positioned in port 24 so that port 24 may be closed as the conical wall of the plug abuts the annular land 96 defined between port 24 and the threaded passage 82. The annular land, then, defines a valve seat.

As seen in FIGS. 6 and 7, in particular, the flared end of the plug 94 is relieved to provide a plurality of segmentally-shaped passages 98, as viewed in FIG. 7, which are separated by an equal number of rib areas 102 which extend downwardly into the interior of valve stem 84. The outer surfaces of the rib areas are in contact with the interior passage 86 and provide the means for fastening plug 94 in this end of the valve stem.

It is believed readily understood that manipulation of the knob 88 causes axial movement of stem 84 which in turn seats or retracts the plug 94 against seat 96 to open or close port 24. The contents of the chamber, when the valve is open, pass through port 24, the segmental passages 98 to the interior of stem 84 through passage 86 for discharge into the specimen receiving receptacle 11 as shown in the FIG. 2 configuration.

The particular valve structure used provides for very minute regulation of the flow therethrough due to the gradually increasing or decreasing degree of opening effected as the tapered plug moves relative to passage 24 and valve seat 96. Obviously, the degree of taper or more precisely the angle of generation for the conical surface of plug 94 dictates the degree at which the valve opens per each revolution having in mind that the pitch of the threads in passage 82 and on stem 84 is fixed. In order to provide for various rates of controlled discharge the apparatus may be supplied with several stems 84 and associated plugs 94 where the angle of generation of the conical surface is varied from one plug to the other. Generally, the standard plug may have an angle of generation of 30° while the additional plugs may have an angle of generation of 15° and 45° respectively to thus provide for a wide range of discharge rates through valve 12.

Referring now to FIG. 4, there is shown a modified form of the invention wherein the valve 12 is disposed in the side wall of the chamber rather than in the end wall. In all other particulars, the apparatus is identical to that described and shown in reference to FIG. 3.

A further modification of the apparatus is illustrated in FIG. 5. In this version, the chamber capacity is increased by providing a cylindrical extension 100 which is provided with an internally threaded end 102 for engagement with the threaded end 26 of chamber 14 and an externally threaded end 104 adapted to receive the threaded skirt 36 of cap 32. The extension is provided with circumferential grooves 106, 108 at each end to receive O-ring seals 110, 112 to completely seal the extension to the chamber on one end and the cap on the other end thereof. The interior bore of the extension is of the same diameter and axially aligned with the chamber defined by cylindrical wall 16 of the chamber 14.

It is believed apparent that more than one extension may be used to thus double or triple the capacity of the apparatus.

Having described the invention in detail, it is obvious that modifications and innovations therein will occur to those skilled in the art and such will fall within the spirit and scope of the inventive concept which is limited only as defined in the claims wherein:

What is claimed is:

1. A cell disruption apparatus comprised of a hollow pressure chamber, said chamber having one conical interior end wall the apex of which defines an outlet port; a manually operated valve having a generally conical plug and a rotary valve stem which seals said port, said plug and stem having discharge passages therethrough; the opposite end of said chamber being open; said chamber having exterior threads adjacent said open end; closure cap threadedly engaged with the open end of said chamber, said cap having a hollow interior receiving the end of a changeable filter assembly, said cap also having an inlet aperture; and seal means positioned between said cap and said filter assembly and said filter assembly and said chamber.

2. A cell disruption apparatus as defined in claim 1, wherein said filter assembly comprises a disc-shaped filter support having oppositely directed nipples; said one nipple being threaded to receive a hollow cap in removable engagement therewith, and filter means disposed between said cap and said nipple.

3. A cell disruption apparatus as defined in claim 2, wherein said filter is a pad of porous material having a pore size of not more than 1.0 micron.

4. A cell disruption apparatus as defined in claim 2, wherein the oppositely directly nipple has a circumferential groove therein; seal means in said groove and adapted to seal against the interior wall of said chamber.

5. A cell disruption means as defined in claim 2, wherein said disc-shaped filter support is provided with O-ring seals which abut the interior of the cap and the end of said chamber to seal the chamber.

6. A cell disruption apparatus as defined in claim 1, wherein said outlet port is provided with an annular seat and said plug includes a conical wall adapted to abut said seat, said plug further having a plurality of passages therein at its flared end whereby liquid may pass between said seat and said plug; said plug being joined with a hollow valve stem through which said liquid is discharged from said chamber.

7. A cell disruption device as defined in claim 1, wherein said port and said plug are aligned axially with the central axis of said chamber.

8. A cell disruption device as defined in claim 1, wherein said port and said plug are disposed at an angle with respect to the central axis of said chamber.

9. A cellular disruption device as defined in claim 1, wherein the angle of generation of the conical surface of said port is at least 15° and not more than 45°.

10. A cellular disruption device as defined in claim 1, including further a hollow cylindrical chamber extension member threaded at one end on the open end of said chamber and receiving said chamber closure in threaded engagement to close its opposite end.

* * * * *